July 4, 1950  F. V. JOHNSON  2,513,329
GYRO VERTICAL

Filed Dec. 1, 1936  2 Sheets-Sheet 1

Inventor:
Frithiof V. Johnson,
by Harry E. Dunham
His Attorney.

July 4, 1950  F. V. JOHNSON  2,513,329
GYRO VERTICAL
Filed Dec. 1, 1936  2 Sheets-Sheet 2
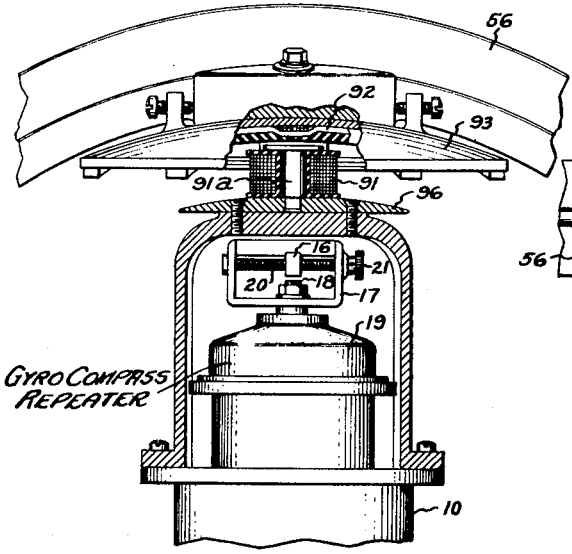
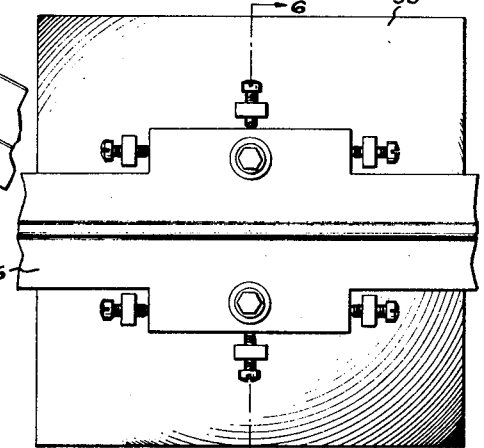
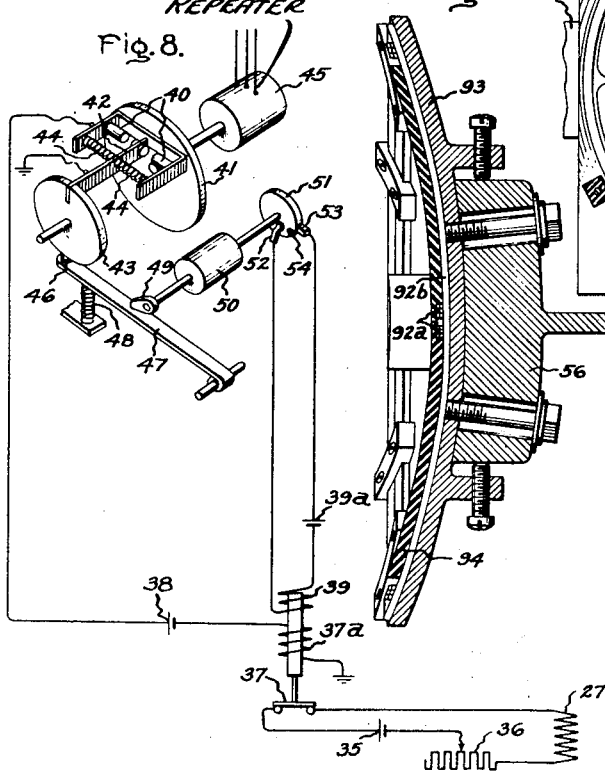
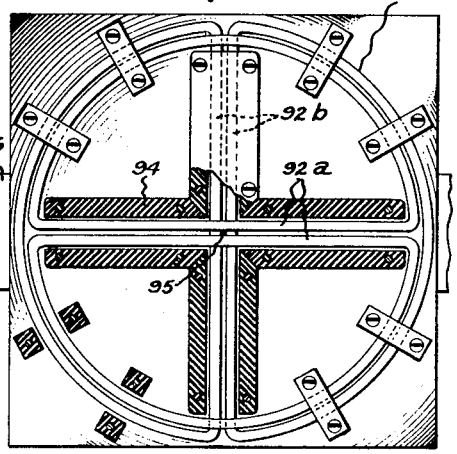
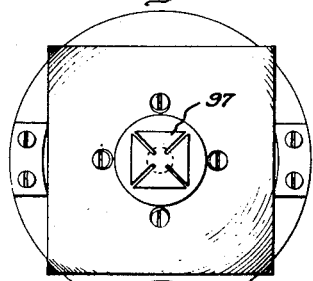
Inventor:
Frithiof V. Johnson,
by Harry E. Dunham
His Attorney.

Patented July 4, 1950

2,513,329

UNITED STATES PATENT OFFICE 2,513,329

GYRO VERTICAL

Frithiof V. Johnson, Schenectady, N. Y., assignor to General Electric Company, a corporation of New York Application December 1, 1936, Serial No. 113,641

7 Claims. (Cl. 74—5.46)

This invention relates to gyro verticals to indicate the vertical in ships, airplanes and like moving objects, and it has for its object the provision of an improved device of this character.

In accordance with this invention, a gyroscope is mounted with its spin axis generally in the vertical direction. It is mounted to have universal freedom of rotation, as by means of a suitable gimbal system. Cooperating with the gyroscope is a suitable controlling device arranged to erect the gyroscope during the starting period and to hold it in the vertical during operation. The controlling means comprises an averaging pendulum mounted for freedom of movement and connected with the gyroscope by means of a suitable coupling. Preferably, an electromagnetic coupling will be used. The electromagnetic coupling is so arranged as to exert upon the gyroscope a precessing torque to cause the gyroscope to follow the average or mean position of the pendulum.

Figure 1:
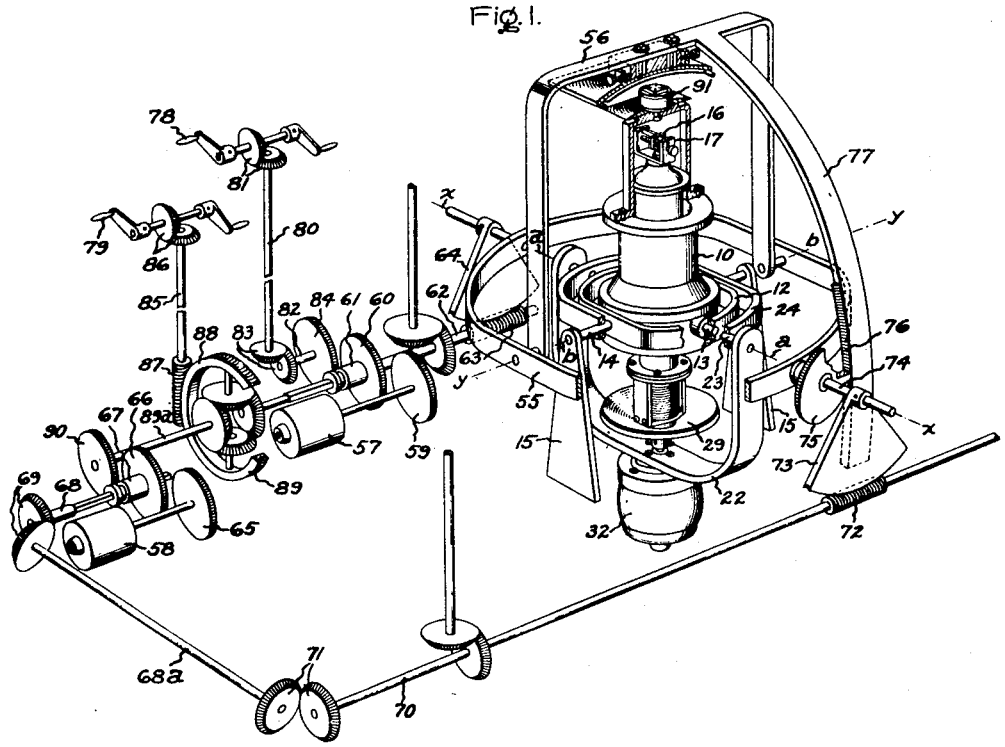
Figure 2:
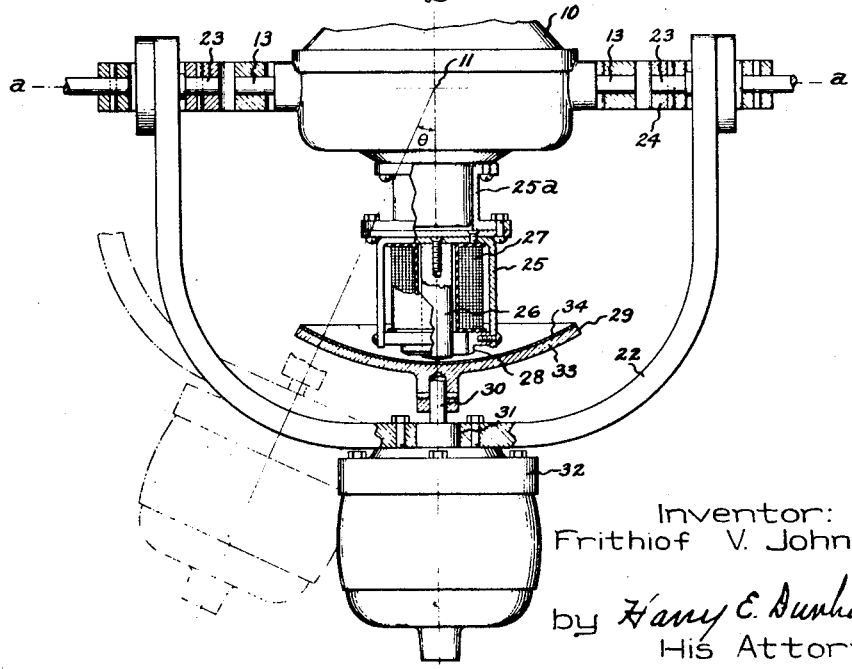

For a more complete understanding of this invention, reference should be had to the accompanying drawings, in which Fig. 1 is a perspective view illustrating a gyro vertical arranged in accordance with this invention, parts being broken away and parts shown in section so as to illustrate certain details of construction; Figs. 2 and 3 are enlarged fragmentary elevations illustrating portions of the mechanism shown in Fig. 1, parts in each figure being shown in section and parts broken away so as to illustrate certain details of construction; Fig. 4 is a top plan view of the portion of the mechanism shown in Fig. 3; Fig. 5 is a bottom plan view of the portion of the mechanism shown in Fig. 3, parts being shown in section so as to illustrate certain details of construction; Fig. 6 is a sectional view taken through the line 6—6 of Fig. 4 and looking in the direction of the arrows; Fig. 7 is a plan view of another of the structure shown in Fig. 3; and Fig. 8 is a diagrammatic representation of certain of the elements of the mechanism shown in Fig. 1, together with certain control means therefor arranged in accordance with this invention.

Referring to the drawings, this invention has been shown in one form as applied to a vertical stabilizer intended to be used on shipboard, airplanes and the like. As shown, the vertical stabilizer comprises a gyroscope 10 which is mounted with its spin axis generally vertical. The gyroscope 10 is mounted for universal freedom of movement about a predetermined suspension point 11 (Fig. 2). The gyroscope 10 is mounted for this movement in a suitable gimbal system comprising a ring 12 in which suitable axles or pins 13 on the gyroscope casing are pivotally mounted. The ring 12 is provided with pins or shafts 14 arranged at right angles to the pins 13 and received in bearings provided in fixed standards 15. The standards 15 function to support the gyroscope on the mount in which the vertical stabilizer is positioned, such as a ship or an airplane. The gyroscope is thus mounted for precision on mutually perpendicular axes $a$—$a$, and $b$—$b$.

It will be understood that a suitable gyroscope wheel (not shown) will be mounted within the gyroscope casing and that it will be driven by means of a suitable motor. Preferably, a three-phase induction motor will be used to drive the gyroscope wheel, and preferably the gyroscope wheel will form the squirrel cage rotor of the motor.

Mounted on the gyroscope casing is a latitude weight 16 mounted in a frame 17 (Figs. 1 and 3). The frame 17 is mounted on the shaft 18 of a receiver of angular motion 19. As shown, the latitude weight is mounted on an adjusting screw 20 which in turn is carried by the frame 17. The axis of the motor 19 lies in the spin axis of the gyroscope. The receiver of angular motion is operated in accordance with the movement of the ship's compass so as to keep the latitude weight always in a certain direction to produce a precession of the gyroscope equal and opposite to its apparent motion due to the earth's rotation in space. If the gyroscope wheel is rotating in a clockwise direction as viewed from above, the receiver 19 will keep the latitude weight always toward the north. The screw 20 constitutes a preliminary adjustment which is set manually by means of a control knob 21 as a function of the ship's latitude. This need be reset only for changes in latitude of the ship. Normally it is unnecessary to change this setting unless the latitude changes by one or two degrees or more. The receiver 19 preferably will be of the alternating current self-synchronous type.

The gyroscope 10 is astatically balanced about the center of movement 11, except for the unbalance produced by the above-mentioned latitude weight 16. Therefore, as is well understood by those skilled in the art, the gyroscope 10, if not otherwise controlled, will tend to maintain its axis in a fixed direction relative to the earth; the effect of the movement of the ship relative to the earth in the position of the gyroscope is negligible and is disregarded.

In order to erect the gyroscope initially so as to have a vertical position with reference to the earth and to hold the vertical position with reference to the earth, controlling means are provided comprising an averaging pendulum 22 which is mounted for freedom of rotation about the center of suspension 11 of the gyroscope. The pendulum 22, as shown, has the form of a ball. The ends of the ball pendulum 22 carry inturned stud shafts 23 which are mounted in a ring 24. The ring 24 is mounted for rotation on the shafts 14 which, as shown, are at right-angles to the stud shafts 23. It will be observed, therefore, that the pendulum 22 is also supported for universal movement about the center 11 on the axes a—a, and b—b.

It will be understood that if the ship or other mount on which the pendulum 22 is mounted maintains a straight course, except for yawing and pitching motions, and at a constant speed, all lateral or horizontal accelerations average out to zero if taken over full periods of roll and pitch. Consequently, the average or mean position of the pendulum is the vertical. The control means of this invention comprises a coupling between the pendulum and the gyroscope whereby the necessary precessing forces are applied to the gyroscope to cause the spin axis of the gyroscope to follow and occupy this mean or average position of the pendulum.

Preferably, an electromagnetic coupling is provided for this purpose. The electromagnetic coupling comprises an electromagnet member 25 mounted on a support 25a attached to the gyroscope casing. The electromagnet has a pole or core 26 and an energizing coil 27 surrounding it. The axes of the pole 26 and coil 27 lie in the spin axis of the gyroscope. That is, the electromagnet 25 is axially symmetrical about the spin axis of the gyroscope. It is to be understood that the electromagnet 25 does not unbalance the gyroscope about its center of suspension 11. In other words, the weight of the electromagnet is taken into consideration when balancing the gyroscope so that the gyroscope is astatically balanced about the center of suspension, as previously mentioned, except for the influence of the latitude weight 16. Preferably, the electromagnet will be provided with an outer continuous annular pole 28 having its central axis in the center of the inner pole 26.

The electromagnetic coupling further comprises an eddy current conductor member in the form of a disc 29 mounted upon the pendulum 22 in close proximity to the ends of the poles 26 and 28. As shown, the eddy current disc 29 is mounted on a shaft 30 which in turn has a bearing 31 in the pendulum. If the pendulum is lying in its vertical position and the gyroscope is also vertical, the axis of rotation of the eddy current disc coincides with the spin axis of the gyroscope, as shown in Fig. 2. The eddy current disc is driven by means of an electric motor 32. While any suitable motor may be used for this purpose, it is preferable to use a direct current shunt motor or an induction motor, and preferably, the motor should have a substantially flat speed-load characteristic. The eddy current disc 29 preferably will be formed of a base 33 made of magnetic iron over which will be placed a thin sheet or layer 34 of metal having a relatively high electrical conductivity, such as zinc or copper. The eddy current disc 29 preferably will have substantially the shape of a section of a sphere, as clearly shown in the drawings, and preferably the center of said sphere will lie in the center of suspension 11.

While the magnet 25 is shown mounted on the gyroscope 10 and the rotary disc 29 on the pendulum, it is to be understood that this arrangement may be reversed; thus, the magnet may be mounted on the pendulum and the rotating disc on the gyroscope. In this case the rotating disc may be driven by the gyroscope shaft, or by a separate motor. Whether the disc be mounted on the pendulum or on the gyroscope, it should be rotated in the same direction as the gyroscope.

The electromagnet 25 will be energized from a direct current source of supply shown diagrammatically in Fig. 8 as a battery 35, and when so energized sets up a magnetic field which is completed between the poles 26 and 28 through the eddy current disc 29. The iron base 33 aids materially in completing the magnetic circuit of the magnetic field. The arrangement of the poles 26 and 28 produces a field having practically perfect symmetry about the spin axis whereby the field is annular and has a substantially uniform intensity at all points at any given radial distance from the axis of the inner pole 26 in a plane perpendicular to that axis.

It will be understood that when this magnetic field is set up and when the eddy current disc is rotated by its motor 32 with the axis of rotation of the disc in coincidence with the spin axis of the gyroscope, substantially no eddy currents are generated in the disc and no torque is applied to the disc. On the other hand if at any time the pendulum 22 be displaced by any amount from the gyroscope axis, as by the angle $\theta$ indicated in Fig. 2, the interaction of the rotating member 29 with the magnetic field produced by the magnet causes eddy currents to flow in the disc 29, principally in the conducting sheet 34 and to a very small extent in the iron base 33. As a result of this, there is a force exerted on the magnet producing a torque on the gyroscope. This force acts on the magnet in a direction normal to the plane of the drawing, and therefore produces a torque about the axis a—a tending to precess the gyroscope into line or correspondence with the pendulum. The magnitude of this torque depends upon the displacement between the gyroscope and the pendulum, on the strength of the magnetic field set up by the magnet 25, and the speed of the eddy current disc 29, and also on certain fixed characteristics, such as the conductivity of the material of which the disc 29 is made, the thickness of the disc and the configuration of the poles of magnet 25. The relation between the torque and the displacement between the gyroscope and the pendulum may be made any desired function by varying the thickness of the disc 29 with distance from the center of rotation of the disc. Preferably, the disc will be so arranged as to produce a slightly rising characteristic of torque as against displacement, for reasons which will be described in greater detail hereinafter.

Thus, the gyroscope tends to precess in such a direction as to follow the position that the pendulum has. So long as the ship or mount upon which the instrument is placed travels in a straight line, the lateral accelerations acting on any point of the ship, and hence, on pendulum 22, average out to zero if taken over a sufficiently long period of time. For although the ship rolls and pitches, it acquires no permanent change in velocity. Hence, so long as the gyroscope axis remains vertical, the gyroscope is acted upon only by torques of very short period, the time integral of which is zero. The deflections of the gyroscope axis from the vertical are therefore very small, and will be of negligible amount by using a small excitation on magnet 25. However, if the gyroscope should depart from the vertical, the pendulum exerts on it a torque which does not average out to zero, but which causes precession of the gyroscope into the vertical.

The amplitude of the forced oscillations of the pendulum from the vertical in the moving ship is not a perfectly linear function of the lateral acceleration but varies with the arc tangent of it, although for displacements which occur in normal operation it is nearly a linear function. However, as pointed out previously, the thickness of the eddy current disc may be varied from its center, and when it is arranged to give the slightly rising characteristic previously referred to, there will result a linear characteristic of torque as against acceleration. This may also be accomplished by varying the air gap between the magnet 25 and the disc; or by varying this air gap and also controlling the thickness of the disc.

The amount of magnetic coupling so to speak between the pendulum 22 and the gyroscope 10 may be varied by varying the excitation of the electromagnet 25, or by varying the speed of the disc 29. In the example illustrated, the excitation is varied. This may be accomplished by means of a variable resistance 36 in the energizing circuit of the magnet. During starting it is the intention to impress upon the electromagnet a strong magnetic current to bring the gyroscope quickly into the vertical. The magnitude of the current is then reduced to a value so small that accelerations due to the roll and pitch of the ship will cause deflections of the gyroscope not to exceed a specified relatively small quantity, such for example as four minutes of arc.

Thus, so long as the ship or mount moves in a straight course, the average or mean position of the pendulum 22 lies in the vertical and the spin axis of the gyroscope 10 likewise lies in the vertical. In cases of unusual or large accelerations, the excitation of the electromagnet 25 should be removed, in order to prevent error due to departure of the mean position of the pendulum from the vertical. For example, if the mount should go into a turn above a predetermined rate, it is possible that such an error would be introduced. Under such conditions, the excitation is removed from the magnet. For this purpose, I provide a suitable turn detector shown in Fig. 8

The turn detector or indicator operates a control contactor 37 connected in series with the operating coil 27 of the electromagnet, as shown diagrammatically in Fig. 8. The operating coil of the contactor is energized by means of a source of electrical supply 38 shown as a battery in Fig. 8. A holding coil 39 is provided for the contactor which in itself is insufficient to open the contactor, but when the contactor has been opened by the main operating coil 37a, will hold the contactor open independently of the coil 37a. The coil 39 is energized from an electrical supply source 39a.

The energization of the coil 37a is controlled by means of a contact device comprising a pair of spaced apart contacts 40 mounted upon a disc 41, and a contact arm 42 interposed between the contacts 40 and mounted on a disc 43. The contacts 40 and 42 are connected into the circuit of coil 37a, as shown, so that when the contact 42 engages either of the contacts 40, it will energize the coil. The intermediate contact 42 is biased to a central position between the contacts 40 by means of centering springs 44. The disc 41 is driven by means of a suitable motor 45 which is a reproducer of angular motion and which is connected to a suitable transmitter of angular motion (not shown) connected to the ship's compass. The reproducer and transmitter preferably will be of the alternating current self-synchronous type. That is, the disc 41 is driven in accordance with the direction of movement of the ship. Therefore, when the course of the ship changes, the position of the disc 41 changes. The disc 43 is controlled by means of a suitable braking device comprising a braking shoe 46 mounted upon a pivotal braking arm 47. The braking arm 47 is biased upwardly, as viewed in Fig. 8, to carry the shoe against the disc 43 by means of a compression spring 48. The arm 47 is periodically moved downwardly to periodically release the disc 43 by means of a cam 49 driven by a motor 50.

It will be observed in view of the foregoing arrangement that when the ship is on a straight course, the position of the disc 41 remains unchanged, and the position of the disc 43 likewise remains unchanged. If, however, the ship goes into a turn above a predetermined rate, the reproducer 45 moves the disc 41 in one direction or the other so as to cause the contacts 40 to engage the contact arm 42, whereby the circuit is completed through the operating coil 37a, to open the contacts 37 and thereby deenergize the operating coil 27 of the electromagnet 25. As pointed out previously, the disc 43 is periodically released by the cam 49. As soon as the disc 43 is released the centering springs 44, of course, immediately move the contact 42 away from the contact 40 to break the circuit of the coil 37a. This would permit the contactor 37 to close, but for the holding coil 39 which maintains the contactor open.

A test is made, however, just preceding the release of the disc 43 to determine whether or not the ship is still in the turn. This is accomplished by momentarily breaking the circuit of the holding coil 39 just prior to releasing the disc 43. It will be observed that the circuit of the holding coil 39 is completed through a contact disc 51 which is rotated by the motor 50. As shown, one side of the coil 39 is connected to the disc by a sliding contact 52 engaging one side of the disc, while the other side of the coil is connected through the disc by a similar contact 53 engaging the periphery of the disc. In this periphery is a suitable insulating block 54 which as it passes over the contact 53 momentarily breaks the circuit to the coil 39.

If when the holding coil circuit is broken just prior to the release of the brake, the ship is still turning, the contactor coil 37a, of course, would still be energized and the contactor 37 would remain in its open position during the momentary interruption in the energization of the holding coil. When the disc 43 is subsequently released to deenergize the coil 37a, the holding coil will have been reenergized to hold the contactor 37 open and when the brake is reapplied, the contacts 40, 42 again close to reenergize the main holding coil 37a. The coil 37a and 39 are alternately deenergized and reenergized in this manner as long as the ship continues to turn.

When the ship ceases to turn, the disc 41, of course, no longer is moved by the receiver 45 so that when the brake is released to permit the centering springs 44 to open the switch contacts 40, 42, the main operating coil 37a of the contactor 37 is deenergized, and is not reenergized. Therefore, when the disc 51 next interrupts the circuit of the holding coil 39, the contact 37 will be permitted to close to reapply the excitation to the electromagnet 25.

The contacts 40 are spaced apart at such a distance from each other that the relatively small deviations from a strictly straight course normally present when a ship is set on a straight course will not cause the excitation to be removed from the electromagnetic coil 27. The particular rate of turn of the ship which will function to remove excitation from the coil may be varied by changing the speed of motor 50. If its speed be increased, the minimum rate of turn at which the excitation is removed will be increased. Conversely, if the speed of the motor be reduced, the excitation will be removed at a lower rate of turn.

It will be understood that the turn detector instead of controlling the electromagnet 27 may be used to control the motor 32 driving the disc 29 to cause the motor to stop when the ship goes into a turn of predetermined rate and to start it again when the ship goes out of the turn.

A suitable power followup system is provided which is caused to follow the spin axis of the gyroscope, that is, which is caused to follow the vertical. The followup comprises a pair of gimbal rings 55 and 56 supported to move on fixed axes $x$—$x$ and $y$—$y$, respectively, arranged at right angles to each other. The position of the ring 55 is controlled by means of a motor 57, whereas the position of the ring 56 is controlled by means of a motor 58. The motor 57 drives a gear 59 which is adapted to mesh with a gear 60 of a suitable clutch 61. The clutch 61 drives a shaft 62 which drives a worm 63. The worm 63 drives a worm sector 64 rigidly secured to the ring 55 so as to complete the driving connection between this ring and the motor 57. The motor 58 drives a gear 65 adapted to mesh with a gear 66 of a suitable clutch 67. The clutch 67 drives a shaft 68 which is connected to a shaft 68a through a pair of bevel gears 69. The shaft 68a in turn drives a shaft 70 through a pair of bevel gears 71. The shaft 70 drives a worm 72 which meshes with a worm sector 73 that is rigidly secured to a shaft 74. The shaft 74 drives a gear 75 which meshes with a rack 76 mounted on an arm 77 rigidly secured to the ring 56 to move it on the axis $y$—$y$.

The two rings 55 and 56 may also be driven by hand cranks 78 and 79 respectively which may be connected to the respective rings through the clutches 61 and 67. As shown, the hand crank 78 drives a shaft 80 through bevel gears 81. The shaft 80 drives a shaft 82 through bevel gears 83, and the shaft 82 drives a gear 84 which is adapted to mesh with the gear 60 of the clutch 61. The hand wheel 79 drives a shaft 85 through bevel gears 86. The shaft 85 drives a worm 87 which drives the outer ring 88 of a differential 89. The output of the differential drives a shaft 89a which in turn drives a gear 90 adapted to mesh with the gear 66 of the clutch 67. The clutches 61 and 67 function to connect either the motors 56 and 57 or the hand wheels 78 and 79 to the rings 55 and 56.

It will be observed that when the shaft 62 is operated either by the motor 57 or the hand wheel 78 to change the position of the ring 55 on its axis $x$—$x$ the position of the ring 56 on its axis $y$—$y$ will be changed by the tilting of the ring 55 due to the interaction of the gear 75 with the rack 76. To compensate for this error that would be introduced, the differential 89 is provided to subtract from the movement which would thus be imparted to the ring 56 a movement of equal and opposite amount.

The motors 57 and 58 are controlled automatically by the precession of the gyroscope. For this purpose, a sensitive pick-up is provided between the gyroscope and the ring system 55, 56. This comprises an electromagnet 91 mounted on the top of the casing of the gyroscope and with its axis coincident with the spin axis of the gyroscope. The electromagnet 91 is excited from any suitable alternating current source of supply (not shown). Interacting with the electromagnet 91 are a series of coils 92 mounted on the gimbal ring 56 above the electromagnet, and arranged in pairs 92a and 92b at right angles to each other, as shown in Fig. 5. The coils 92, as shown, are relatively large and have a semicircular form. The coils are supported upon an iron plate 93, that is square in plan, and which preferably is in the form of a segment of a sphere. Supported under the plate 93 is an insulating member 94 having a cross shape, as shown in Fig. 5. The pair of coils 92a have their diametral portions received in a transverse slot through one arm of the cross while their arc portions lie opposite each other, as clearly shown in Fig. 5. The other pair of coils 92b are arranged in a similar manner, but at right angles to the coil 92a.

It will be understood that the electromagnet 91 sets up a magnetic field the flux of which cuts the turns of the coils 92a and 92b. So long as the axis of the magnet 91 lies in the central axis of the coils denoted by the numeral 95 in Fig. 5, the flux interlinking the various coils induces voltages in the coils which are balanced. However, if any displacement occurs between the axis of the magnet and the center of the coils 95 a voltage unbalance occurs in one or both pairs of coils. This voltage unbalance induced in the coils is utilized to operate the motors 57 and 58. The voltage induced in the coils 92a is utilized to control the motor 58, whereas the voltage induced in the coils 92b controls the motor 57. Any suitable control system which will amplify the voltages induced in the coils 92a and 92b and utilize the amplified voltages to control the motors 57 and 58 may be used. For example, the control system shown in the United States patent to A. H. Mittag, No. 1,684,137, dated September 11, 1928, may be used. In this patent the winding 19 corresponds to the magnet 91 of this application and the winding 18 corresponds to the set of the coils 92 in which voltage is unbalanced by a relative displacement of the axis of the magnet from the center of the coils. The motor 12 of the Mittag patent corresponds to the motor 57 or 58. The voltage output of the coils 92 will be amplified in the tubes 24 and 25 of Mittag just as they amplify the voltage output of winding 18 of Mittag. This amplified output in turn is amplified in the amplifiers 35 and 36 of Mittag and finally is utilized to drive the corresponding motor 57 or 58, as is the motor 12 of Mittag controlled by the output of the members 35 and 36 of the Mittag patent. In Mittag the unbalance between the windings 17 and 18 is caused by the motion of a transmitter 14. In this application the unbalance between the magnet 91 and coils 92 is caused by relative movement between them. Therefore, the transmitter 14 of Mittag will not be used here; nor will the anti-hunting windings 60 and 61 and their associated motor 63 be used.

Preferably, a square plate 96 will be interposed between the top of the gyroscope 10 and the magnet 91. This plate will have an upper curved surface, substantially parallel with the lower curved surface of the upper plate 93, and at its center will be connected with the core or pole 91a. It will be understood that the flux passing from the magnet will be directed upwardly through the coils and plate 93 and will return to the pole piece 91a in the main through the plate 96 although there is considerable leakage directly to the pole. Also preferably, the pole 91a at its upper end will terminate in a plate 97 which increases the total flux and hence the rate of change of induced voltage with displacement.

It is to be understood that here again, the electromagnet 91, the plate 96, as well as all other auxiliary apparatus that is attached to the gyroscope 10 is taken into account when suspending the gyroscope for precession about the point 11, and that the gyroscope 10, together with all the auxiliary apparatus attached to it are astatically balanced about this point.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent in the United States is:

1. A vertical stabilizer for ships and the like comprising a gyroscope and pendulum mounted for freedom of movement about a common suspension point, an electromagnetic coupling between said gyroscope and pendulum applying a precessing torque to said gyroscope responsive to relative movement between said gyroscope and pendulum so as to cause the spin axis of said gyroscope to point substantially to the mean position of said pendulum, an energizing circuit for said electromagnetic coupling, a contactor arranged to open and close said circuit, an energizing circuit for said contactor arranged when energized to open said contactor and thereby said circuit for said coupling and when deenergized to permit said contactor to close to reenergize said coupling, means for energizing said contactor circuit responsively to change in direction of said ship, a holding coil for said contactor to hold it in its open position, means for energizing said holding coil and for periodically deenergizing it momentarily, and means for deenergizing said contactor circuit after said momentary interruption in the energization of said holding coil.

2. A turn indicator for ships and the like, comprising relatively movable elements, means biasing said elements to a predetermined relative position, control means operated by relative movement of said elements from said position, a brake for one of said elements, means periodically releasing said brake, and means for moving another of said elements responsively to change in direction of said ship so that said members are moved relatively to each other from said predetermined position to operate said control means when said other element is moved responsively to said change in direction and said brake is applied, said members being returned to said predetermined position by said biasing means each time said brake is periodically released.

3. A turn detector for ships and the like comprising an electroresponsive control device, an operating coil for said control device, cooperating switch contacts, an energizing circuit for said operating coil controlled by said contacts, means movably supporting said contacts for independent movement, means biasing said contacts to a predetermined relative position wherein said energizing circuit is opened, means for driving one of said contacts responsively to the direction of motion of said ship, a brake for the other of said contacts holding it so that said contacts move relatively to another position to close said energizing circuit when said one is moved by said driving means, means for releasing said brake periodically, a holding coil for said electroresponsive control device, means for energizing said holding coil and means deenergizing said coil momentarily just before said brake is released.

4. A gyro vertical adapted to be mounted on a moving vehicle comprising a gyroscope and a pendulum mounted for universal movement, an electromagnetic coupling between said gyroscope and said pendulum for applying a precessing torque to said gyroscope responsive to relative movement between said gyroscope and said pendulum so as to cause the spin axis of said gyroscope to point substantially to the mean position of said pendulum, an energizing circuit for said electromagnetic coupling, switching means arranged to open and close said circuit, and means responsive to a rate of change in the direction of movement of said vehicle in excess of a predetermined value for actuating said switching means to disable said electromagnetic coupling.

5. In combination with a universally pivoted gyroscope, an erecting device for erecting the gyroscope to a reference position bearing a predetermined relation to the direction of gravity, said device comprising a universally mounted pendulum, a first member mounted on said gyroscope, a second member mounted on said pendulum for movement therewith relative to said first member, one of said members comprising a rotatable eddy current conductor and the other a magnet, said magnet comprising an inner pole and an outer continuous annular pole in concentric relation with said inner pole thereby to provide an annular magnetic field between the ends of said poles having a substantially uniform intensity at all points at any given radial distance from the axis of said inner pole in a plane perpendicular to said axis, the ends of said poles being mounted in close proximity to said conductor so that said magnetic field threads said conductor and when said conductor is rotated with said poles and said conductor in positions of axial coincidence substantially no eddy currents are generated in said conductor, and means for rotating said conductor in a direction such that upon a relative displacement of said poles and said conductor from said position of axial coincidence an eddy current drag torque is produced on said conductor to precess said gyroscope in a direction to restore axial coincidence of said poles and said conductor.

6. In combination with a gyroscope universally pivoted about a predetermined point, an erecting device for erecting the gyroscope to a reference position bearing a predetermined relation to the direction of gravity, said device comprising a pendulum universally mounted about said point, a first member mounted on said gyroscope, a second member mounted on said pendulum for movement therewith relative to said first member, one of said members comprising a rotatable eddy current conducting disc substantially in the form of a segment of a sphere with its center substantially in said predetermined point, and the other a magnet, said magnet comprising an inner cylindrical pole and an outer continuous annular pole in concentric relation with said inner pole thereby to provide an annular magnetic field between the ends of said poles having a substantially uniform intensity at all points at any given radial distance from the axis of said inner pole in a plane perpendicular to said axis, said poles being mounted in close proximity to said disc so that said magnetic field threads said disc and when said disc is rotated with said poles and said disc in positions of axial coincidence substantially no eddy currents are generated in said disc, and means for rotating said disc in a direction such that upon a relative displacement of said poles and said disc from said position of axial coincidence an eddy current drag torque is produced on said disc to precess said gyroscope in a direction to restore axial coincidence of said poles and said disc.

7. In combination with a universally pivoted gyroscope, an erecting device for erecting the gyroscope to a reference position bearing a predetermined relation to the direction of gravity, said device comprising a universally mounted pendulum, a first member mounted on said gyroscope, a second member mounted on said pendulum for movement therewith relative to said first member, one of said members comprising a rotatable eddy current conducting disc and the other an electromagnet, said electromagnet comprising an inner cylindrical pole and an outer continuous annular pole in concentric relation with said inner pole thereby to provide an annular magnetic field between the ends of said poles having a substantially uniform intensity at all points at any given radial distance from the axis of said inner pole in a plane perpendicular to said axis, said poles being mounted in close proximity to said disc so that said magnetic field threads said disc and when said disc is rotated with said poles and said disc in positions of axial coincidence substantially no eddy currents are generated in said disc, means for rotating said disc in a direction such that upon a relative displacement of said poles and said disc from said position of axial coincidence an eddy current drag torque is produced on said disc to precess said gyroscope in a direction to restore axial coincidence of said poles and said disc, and means for varying the energization of said electromagnet to vary the erection rate of said gyroscope.

FRITHIOF V. JOHNSON.

REFERENCES CITED

The following references are of record in the file of this patent:

UNITED STATES PATENTS

| Number | Name | Date |
|---|---|---|
| 949,351 | Clayton | Feb. 15, 1910 |
| 1,310,862 | Gray | July 22, 1919 |
| 1,610,279 | Gilchrist | Dec. 14, 1926 |
| 1,651,845 | Sperry | Dec. 6, 1927 |
| 1,825,345 | Fieux | Sept. 29, 1931 |
| 1,942,470 | Bassett | Jan. 9, 1934 |
| 2,229,645 | Esval | Jan. 28, 1941 |
| 2,406,845 | Moore | Sept. 3, 1946 |

FOREIGN PATENTS

| Number | Country | Date |
|---|---|---|
| 760,535 | France | Dec. 14, 1933 |
| 291,047 | Great Britain | Mar. 19, 1928 |
| 359,071 | Great Britain | Oct. 22, 1931 |
| 402,890 | Great Britain | Dec. 14, 1933 |